United States Patent [19]
Watwood et al.

[11] Patent Number: 6,007,082
[45] Date of Patent: Dec. 28, 1999

[54] WHEELCHAIR DRIVER AND BRAKING SYSTEM

[76] Inventors: Brian M. Watwood, 6650 Arabian Cir., Granite Bay, Calif. 95746; Errol C Armstrong, 192A Walker Valley Rd., Castroville, Calif. 95012

[21] Appl. No.: 08/649,592
[22] PCT Filed: Nov. 19, 1993
[86] PCT No.: PCT/US93/11245
  § 371 Date: Oct. 7, 1996
  § 102(e) Date: Oct. 7, 1996
[87] PCT Pub. No.: WO95/13954
  PCT Pub. Date: May 26, 1995
[51] Int. Cl.[6] .................................................... B62M 1/16
[52] U.S. Cl. ......................... 280/244; 188/2 F; 280/246; 280/250.1
[58] Field of Search .............................. 280/250.1, 304.1, 280/304.2, 242.1, 243, 244, 251, 252, 253, 246, 247; 188/2 F, 68, 335

[56] References Cited

U.S. PATENT DOCUMENTS

| | | | |
|---|---|---|---|
| 2,130,426 | 9/1938 | Henderson | 280/244 |
| 3,189,368 | 6/1965 | Petersen | 280/250.1 |
| 3,301,574 | 1/1967 | Good | 280/250.1 |
| 3,309,110 | 3/1967 | Bulmer | 280/244 |
| 3,869,146 | 3/1975 | Bulmer | 280/244 |
| 3,877,725 | 4/1975 | Barroza | 280/250.1 |
| 4,354,691 | 10/1982 | Saunders et al. | 280/244 |
| 4,538,826 | 9/1985 | Lemarie | 280/244 |
| 5,232,236 | 8/1993 | Korpi | 280/250.1 |
| 5,263,729 | 11/1993 | Watwood et al. | 280/246 |

FOREIGN PATENT DOCUMENTS

| | | | |
|---|---|---|---|
| 67035 | 12/1982 | European Pat. Off. | 280/244 |
| 2642278 | 3/1978 | Germany | 280/250.1 |
| 987157 | 2/1964 | United Kingdom | 280/250.1 |
| 1067901 | 5/1967 | United Kingdom | 280/250.1 |
| 2213438A | 8/1989 | United Kingdom | 280/250.1 |

*Primary Examiner*—Anne Marie Boehler
*Attorney, Agent, or Firm*—Bernhard Kreten

[57] ABSTRACT

A wheelchair driver having a simple, efficient structure is mountable to a horizontal frame extension of a wheelchair between a wheel and the wheelchair's frame. The driver is mounted directly to a spindle sleeve fastened to the horizontal frame extension which provides a race for the driver to run upon. The spindle sleeve also isolates the driver from the wheel preventing any friction between the wheel and the driver. The driver has a lever extending upward from the spindle sleeve above the tire of the wheel. A handle is provided on the uppermost end for a user. The lever has a pawl extending over the tire of the wheel. The pawl has teeth on a lower surface and contacts against the tire. When the lever is rotated around the spindle sleeve, the pawl teeth grab the tire, causing the wheelchair to move. When the lever is stopped or rotated oppositely, the pawl teeth release the tire and allow the wheelchair's momentum to move the wheelchair until another forward rotation of the lever provides additional force. Brake pads on the lever, adjacent to rims of the wheels, are forcible against the rims, providing the user with a wheelchair brake. The wheelchair driver provides a user with a safe and efficient method of wheelchair motivation which does not require gripping and releasing of any moving part of the wheelchair.

15 Claims, 9 Drawing Sheets

WHEELCHAIR DRIVER AND BRAKING SYSTEM

TECHNICAL FIELD

The following invention relates to devices for manually moving a wheelchair with the user in the wheelchair providing the motivating force. More specifically, this device relates to wheelchair movement devices which allow the user to push on levers to cause wheelchair motion without requiring the user to continually grip and release any moving parts.

BACKGROUND ART

The usual method of wheelchair movement is for the user to grip circular handrails fixedly mounted to the outside of the wheelchair's wheels. To do this, the user must continually grab, push and release the handrail. For many users, this action is very difficult or even physically impossible. Many devices in the art provide alternative wheelchair moving means which do not require the user to continually grip and release moving parts. Each of these devices in the prior art have disadvantages not shared by the device of this application. Some of the prior art devices restrict the free motion of the wheels increasing rolling resistance of the wheels and increasing the physical exertion required to move the wheelchair. Other devices in the prior art extend outside the wheels of the wheelchair increasing the width of the wheelchair and making the wheelchair more cumbersome to maneuver in tight spaces. Still other devices in the prior art require extensive mechanical modification of the wheelchair and hamper standard adjustments of the wheelchair increasing the cost and complexity of maintenance and repair of the wheelchair.

The following patents reflect the state of the art of which applicant is aware and are included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| INVENTOR | PATENT NO. | ISSUE DATE |
| --- | --- | --- |
| Krueger, T. F. | 654,986 | July 31, 1900 |
| Williams, T. E. | 838,228 | December 11, 1906 |
| Everest et al. | 2,643,898 | June 30, 1953 |
| Petersen | 3,189,368 | June 15, 1965 |
| Bulmer | 3,309,110 | March 14, 1967 |
| Good | GB 1,067,901 | May 13, 1967 |
| Bulmer, D. L. | 3,869,146 | March 4, 1975 |
| Barroza | 3,877,725 | April 15, 1975 |
| Saunders et al. | 4,354,691 | October 19, 1982 |
| Platt et al. | GB 2,110,780A | June 22, 1983 |
| Lucken, W. O. | 4,453,729 | June 12, 1984 |
| Korosue, A. | 4,506,900 | March 26, 1985 |
| Tait, R. E. | 4,735,431 | April 5, 1988 |
| Myron Medical Products Ltd. | GB 2,213,438A | August 16, 1989 |

The patent to Bulmer teaches a device for moving a wheelchair without requiring the user to grip and release any moving parts. Bulmer is distinguishable from the device of this application in that the Bulmer device places the main lever arm outside the wheel on each side of the wheelchair. This increases the width of the wheelchair and increases the likelihood that the lever will catch on a passing object. Also, the lever of the Bulmer device is of a material flexible enough to allow the brake pad to engage the rim of the tire. This requires a material of sufficient flexibility.

The present invention utilizes a rigid lever with flexibility designed into the interface between the lever and its spindle sleeve. Furthermore, the device of this application has a spindle sleeve upon which the lever is mounted which isolates the lever from the wheel. This feature prevents the lever from interfering with the free rotation of the wheel and also allows the wheel to be easily removed or adjusted without removal of the wheelchair driving device.

The pawl construction of the instant invention is further distinguished over the pawl construction of the Bulmer device in that the curved toothed surface of the instant device more easily grips and releases the tires of the wheelchair. The construction of the pawl of the instant invention utilizes gravity to engage and release the pawl's curved toothed surface from the surface of the tire. This feature lessens the force necessary to engage and release the wheelchair driver while causing less wear to the tires. A corollary benefit to the curved tooth surface manifests itself when the chair travels in reverse.

The invention by Everest is of interest in that it has levers which the user can keep his or her hands on at all times. The device of this application is distinguishable from Everest in that the Everest patent requires substantial modification to the wheels of the wheelchair and also the Everest invention requires that the user learn to coordinate the power strokes of each lever together in alternating patterns while the device of this application allows a user to establish a motion pattern that is the most convenient, such as pushing together with both hands simultaneously. Furthermore, the Everest device lacks the simplicities of action associated with a pawl attached to a lever.

The patent to Tait provides a device which includes a lever which drives wheels of a wheelchair. The Tait device is substantially different from the device of this application in that it requires substantial modification of the standard wheelchair, requiring that gears and belt or chain drives be mounted on the wheelchair. The device of this application is easily attachable to a standard wheelchair and avoids interfering in any way with the existing operation of the wheelchair.

The other prior art patents listed above diverge more starkly from the present invention than those specifically distinguished. The device of this application provides a unique and useful method of modification of a wheelchair to provide users with limited physical abilities with a means for transporting themselves without assistance.

DISCLOSURE OF INVENTION

This wheelchair driver is, in essence, a simple lever arm which is mounted to a horizontally oriented portion of the frame which supports the wheels of a wheelchair through a spindle sleeve. The lever arm has a lever collar on an axial end of the lever arm adjacent to the spindle sleeve. The lever collar is sized to fit over the spindle sleeve. The spindle sleeve provides a race upon which the lever collar can run providing the lever with a low friction rotational interface. The spindle sleeve restricts the axial end of the lever arm from translation along the horizontal frame portion ensuring that the wheelchair's wheel rotation is not hampered.

To install the wheelchair driver, both wheels are removed and a driver is installed on each side of the chair and then the wheels are replaced. Each lever has a handle mounted on an orbiting end of the lever opposite the axial end. Each handle is adjustable to conform to the palm of a user's hand for maximum comfort and utility. A rotating pawl is mounted on the lever in a proper position to contact the upper surface of the tire of each wheel. The surface of the pawl which contacts the tire is serrated so that when the user pushes forward on the lever, teeth of the pawl grip each of the wheels and transfers rotational force to each wheel. After the power stroke in one direction (e.g. forward), the user pulls back the lever towards his or her body and the pawl automatically releases the tire and pivots out of the way to allow the wheelchair's momentum to carry the wheelchair along without interference. Therefore, the user simply pumps the wheelchair along by pushing the handles and then by bringing them back and then by pushing again.

The handles can be fitted with a variety of devices, such as straps, to hold the user's hands in place. The lever is designed to allow a slight "rocking" movement which is outwardly perpendicular to the forward and backward oscillatory motion of the lever as it rotates about the spindle sleeve attached to the wheelchair frame on a power stroke. Brake pads are attached to the lever adjacent the wheel rims which hold the tires of the wheel. When the levers are thusly pushed outwardly perpendicular to the power stroke, the brake pads abut against the rims of the wheels, causing the speed of the wheelchair to be reduced.

The wheelchair driver is easily attachable to the wheelchair frame by merely removing the wheels, installing the spindle sleeve, installing the driver and reinstalling the wheels. The levers can also be adjusted in length allowing the pawls to effectively interface with the tires of the wheels and still be comfortable for the user to grip. Once attached and adjusted the Wheelchair drivers are ready for use.

BEST MODE(S) FOR CARRYING OUT THE INVENTION

Referring now to the drawing figures (e.g. FIG. 12) wherein like reference numerals represent like parts throughout, numeral 10 refers to a wheelchair driver. The driver 10 is attachable to a wheelchair 100 providing motion to the wheelchair 100. In essence, the driver 10 has a lever 40 attached to a spindle sleeve 80 fastened to the frame 110 on an axial end 44 of the lever 40 adjacent the spindle sleeve 80 and has a handle 20 on an orbiting end 46 of the lever 40 remote from the spindle sleeve 80. A pawl 50, attached along the lever 40, interfaces with a tire 130 mounted on a wheel 120. When a wheelchair occupant applies force to the handle 20, the lever 40 rotates about the spindle sleeve 80 and the pawl 50 engages the tire 130 causing the wheel 120 to rotate, thus causing the wheelchair 100 to move.

More specifically, the lever 40 is an elongate rigid structure having the axial end 44 located around the spindle sleeve 80 of the wheelchair 100 with the orbiting end 46 located above the spindle sleeve 80 and between the wheel 120 and a frame 110 of the wheelchair 100.

The spindle sleeve 80 is formed from an inside spindle sleeve half 82 and an outside spindle sleeve half 84. The two halves 82, 84 fasten together around the frame 110 and a horizontal frame extension 70 which receives an axle 72 of the wheel 120. The two halves 82, 84 are fastened by spindle sleeve fasteners 86, preferably bolts within threaded holes in the halves 82, 84.

The spindle sleeve 80 surrounds a junction of the frame 110 and the horizontal frame extension 70. The axle 72 of the wheel 120 is not contacted by the sleeve 80 but rather passes through an interior of the horizontal frame extension 70 along a line horizontal and perpendicular to wheelchair 100 motion. A nut N retains the axle 72 within the horizontal frame extension 70 and also remains clear of the spindle sleeve 80. Thus, while the sleeve 80 is near the wheel 120 frame 110 junction, it does not interfere with these existing wheelchair 100 parts at all.

Figure 1:
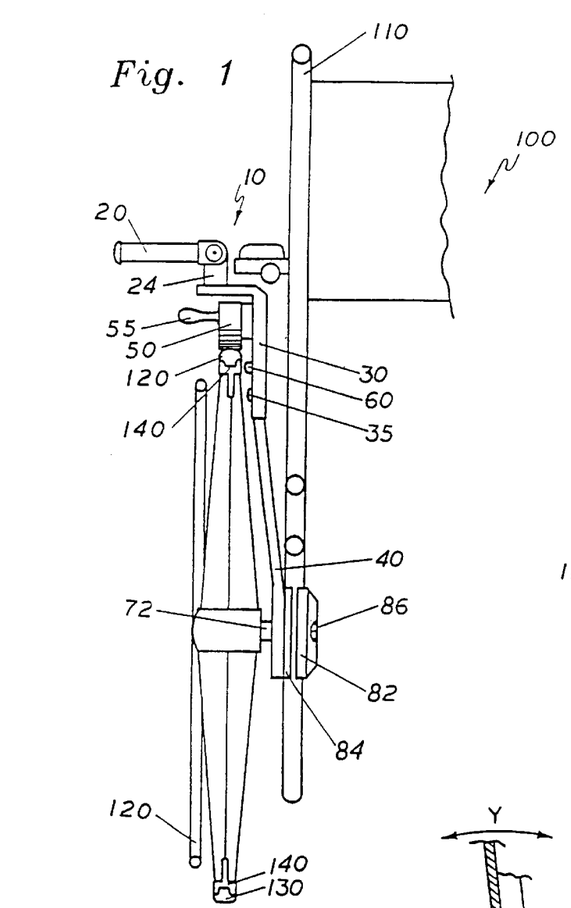
FIG. 1 is a front view of the device of this application mounted on one wheel of a wheelchair.
Figure 2:
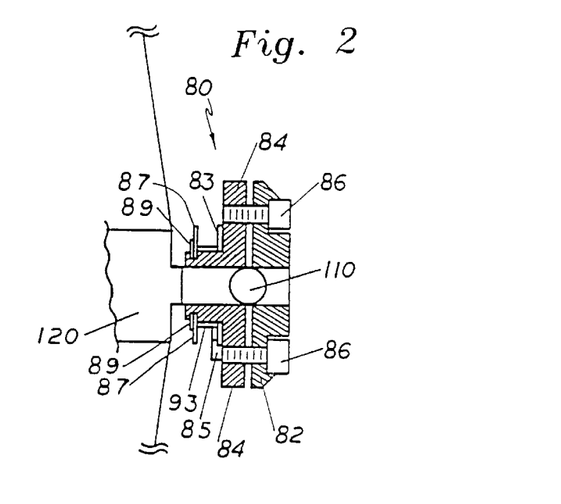
FIG. 2 is a top view of a portion of that which is shown in FIG. 1.

The axle 72 has a threaded end 71 which passes through the frame 110 and is retained via a nut N. The axial end 44 of the lever 40 connects over the spindle sleeve 80 where the spindle sleeve 80 extends to form a boss 81 covering the horizontal frame extension 70. The axial end 44, shown in detail in FIGS. 3, 4, 5 and 7, is provided with a lever collar 48 which defines a circular hole. The hole is sized to fit over the boss portion 81 of the spindle sleeve 80 shown in FIGS. 2, 3 and 4.

The outside half 84 of spindle sleeve 80 supports a washer 83, an inner race 93, a washer 87 and a lock ring 89 within groove 91 formed on boss 81. The lock ring 89 retains the washers 83, 87 and inner race 93 upon the boss 81. These parts restrain the axial end 44 of the lever 40 from translation along and off the boss 81 of the spindle 80. These parts also provide low friction contact surfaces for free rotation of the axial end 44 of the lever 40 about the boss 81 of the spindle sleeve 80. The washer 87 abuts against the lock ring 89 in one side and a lever arm bearing 47 on the other side. The bearing 47 is interposed between the inner race 93 of the boss 81 and the hole defined by the collar 48. Bearing 47 fastens to the axial end 44 by a screw S which fastens into the threaded hole 43 in the axial end 44.

The bearing 47 which therefore supports the axial end 44 of the lever 40 includes both play on the boss 81 and clearance on its sides embodied as two beveled notches 45 (FIG. 3) of equal size, one on an outer upper surface and another on an inner lower surface. The notches 45 and the center bore are sized to allow the lever 40 to pivot "outward" enough, i.e. along arrow Y, to cause a brake pad 60 to impact a rim 140 causing the wheelchair 100 to slow down. The notches 45 thus provide one form of a clearance means for the lever. Further details of the brake follow infra.

Figures 5, 6, 7:
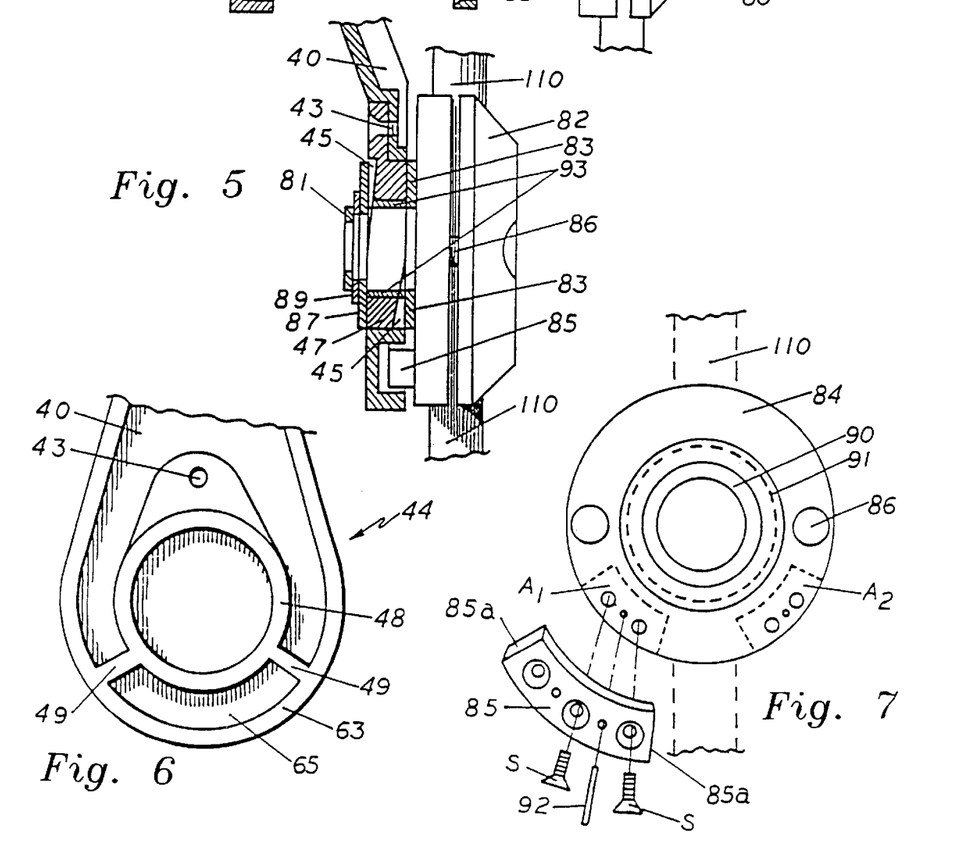
FIG. 5 is a cutaway front view of a portion of the device.
FIG. 6 is a side view of a portion of the device with some parts exploded to reveal details.
FIG. 7 is a side view of a portion of the device.

The lever arm axial end 44 includes webs 49 which extend radially from the collar 48 as shown in FIG. 7. A drive socket 65 is formed between the webs 49, the collar 48 and the lever flange 63. The socket 65 loosely fits over a restricting plate 85 which curves to maintain a constant distance from the horizontal frame extension 70. The length of the restraining plate 85 is calculated to limit the lever 40 from full rotation around the horizontal frame extension 70. This lever 40 motion range extends from where outer radial edges 85a of the plate 85 abut with the webs 49 and the plate 85 and webs 49 provide one form of a lever rotation restricting means at extremities of the lever 40 travel. Thus, the range of motion of lever 40 is determined by the clearance between plate 85 and webs 49.

Figure 4:
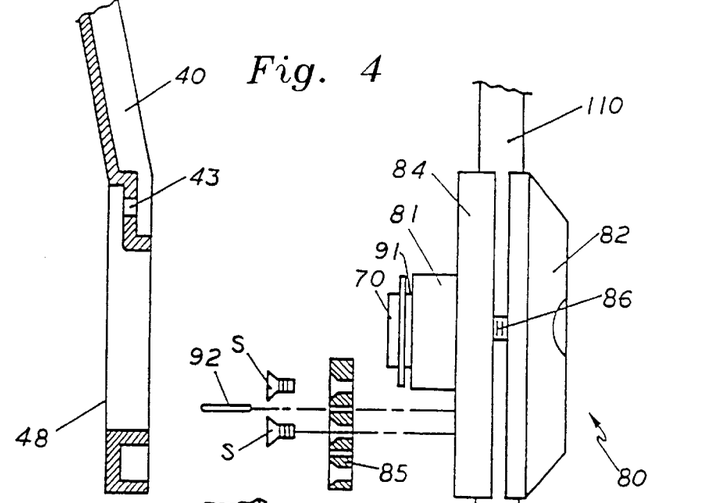
FIG. 4 is an exploded parts view revealing details of a portion of this application.

Note that the restricting plate 85 is placed on the outer half 84 of spindle sleeve 80 and facing the lever arm axial end 44 preordains the length of the arc of travel of the lever 40 and handle 20. Screws S fix the restraining plate 85 in, either of two areas, $A_1$, $A_2$ which determine right or left side lever 40 orientation on the wheelchair 100. FIG. 4 shows three holes for screws in plate 85, two of which align with holes on area $A_1$, or $A_2$. The additional two holes in plate 85 are for the roller pin 92 which passes between plate 85 and half 84 to dissipate imposed loads in use.

Figure 8:
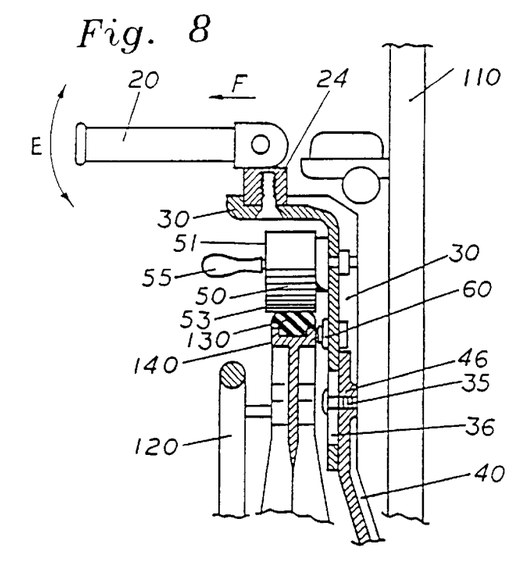
FIG. 8 is a front view detail of an upper portion of the device of this invention.
Figure 10:
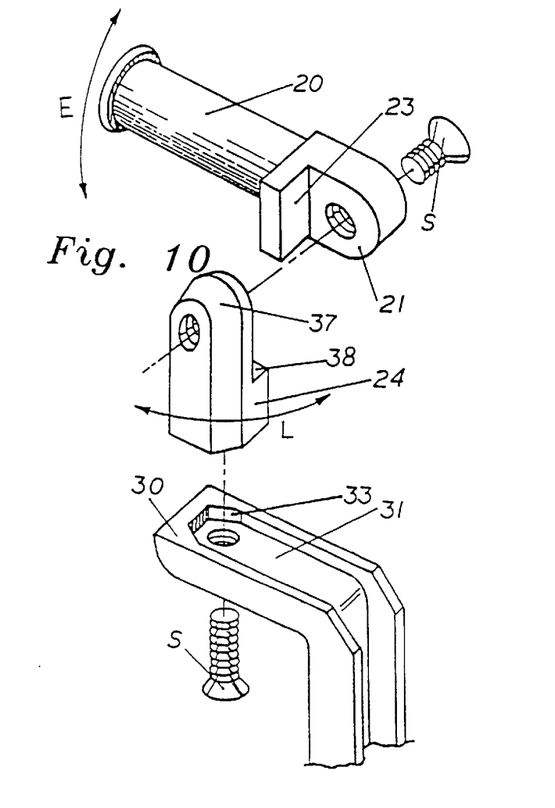
FIG. 10 is an exploded parts view of an upper portion of the device.

A handle base bracket 30, shown in detail in FIGS. 8 and 10, is adjustably interposed between both the orbiting end 46 of the lever 40 and the handle 20. The bracket fastener 35 fastens the handle base bracket 30 to the orbiting end 46 of the lever 40 in any one of a variety of different horizontal plane orientations, allowing the driver 10 to be adjusted to variable wheel 120 sizes.

A vertical slot 36 in the bracket 30 allows the bracket to move along the length of the slot 36 when the fastener is loosened. The handle 20 is rotatably attached to a handle base 24 to allow rotation of the handle 20 about its axis of connection there between (i.e. along arrows E). The handle base 24 is fastened to the upper end of the bracket 30 and can be reoriented about axis "L". More specifically, base 24 resides within a trough 31 formed on a top surface of a horizontal leg of an inverted substantially "L" shaped bracket 30. The bracket 30 has a vertical leg which connects to the orbiting end 46 of lever 40. The trough 31 has at least one facet 33 which abuts against the base 24 so that when a screw S fastens the base to the trough 31, the base 24 will not rotate. The facet 33 contacts at least one facet of a sidewall of base 24 for secure engagement when screw S clamps the base 24 to the trough 31.

An upper end of the base 24 has upwardly projecting ear 37 and a medially disposed shelf 38. Ear 37 contacts a complemental tab 21 on the handle 20 and a handle abutment 23 can contact the base 24 for added secureness when the handle 20 is screwed to the base 24. Thus, the handle 20 extends from the bracket 30 in a horizontal direction orthogonal to wheelchair 100 travel unless the handle 20 is pivoted vertically for greater utility to the wheelchair occupant.

In an alternative embodiment, the handle 20 is equipped with straps or other fasteners (not shown) which keep the hands of the occupant in contact with the handle 20.

The pawl 50 is also rotatably attached to the bracket 30. Please see FIG. 9. The pawl 50 fastens to the bracket 30 below the handle 20 and extends from the bracket 30 over the wheel 120. The pawl 50 is a somewhat circularly shaped construct mounted off-center on the vertical leg of bracket 30. In essence, it has an upper end 51 which fastens through a pivot point 54 to the bracket 30 in a rotatable fashion about arrow C, and a lower end 53. The lower end 53 has teeth 52 shaped to securely grip the tire 130 of the wheel 120. A handle 55 allows orientation of the pawl 50 into one of three positions—one for forward drive of the wheelchair (FIG. 9) and the other for rearward drive (FIG. 11) or a neutral non-drive position (not shown). The offset nature of the pawl 50 and the two drive positions provides bite in the wheel 120. The pawl 50 thus provides one form of a wheel gripping means for the lever 40.

Figure 3:
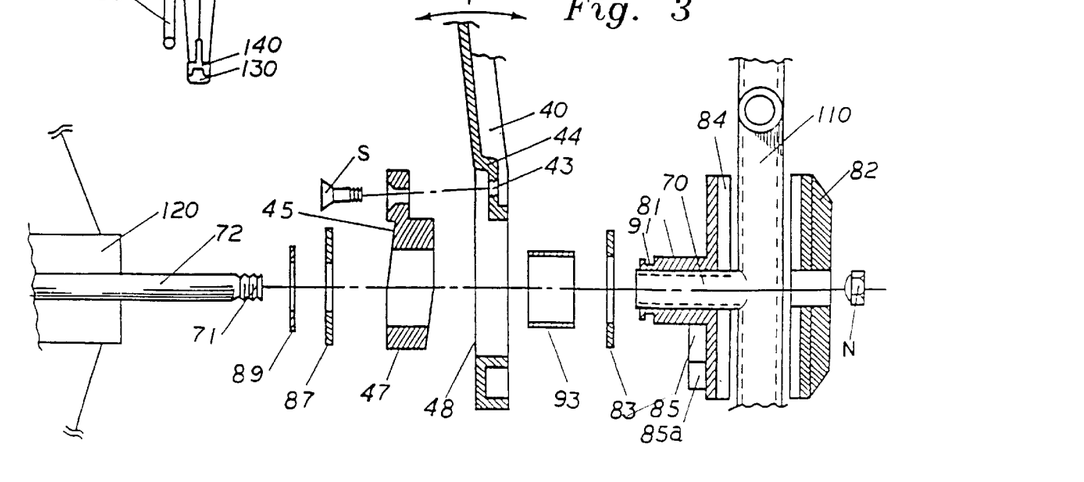
FIG. 3 is an exploded parts view of the device of this application in section revealing details which allow the lever to "rock" engaging and disengaging the brake.
Figure 11:
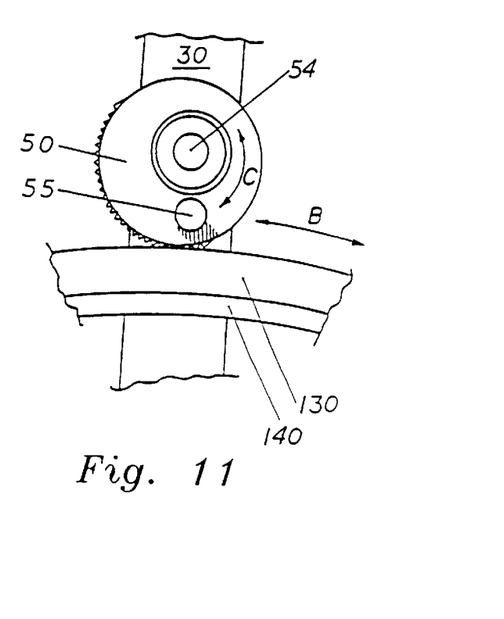
FIG. 11 is a side view similar to that which is shown in FIG. 9 in a second position.

Fixedly attached to the bracket 30 is a brake pad 60, shown in detail in FIG. 11. The brake pad 60 is located adjacent to a rim 140 of the wheel 120. The brake pad 60 does not touch the rim 140 under driving conditions due to the lever 40 being pulled in towards the chair center by virtue of the clearance provided with clearance notches 45 in the bearing 47 (FIG. 3).

Figure 9:
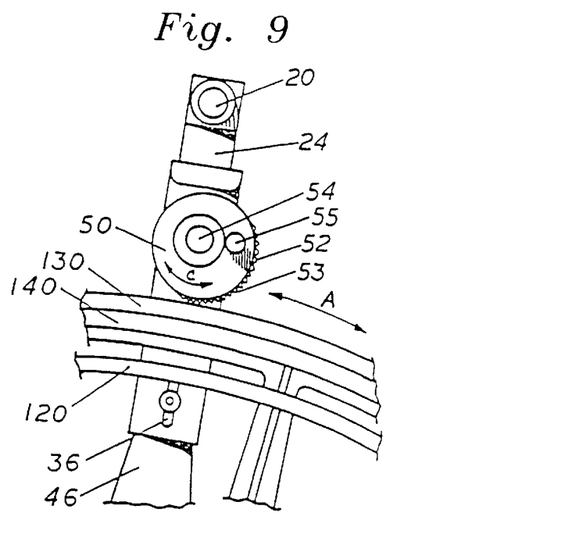
FIG. 9 is a side view detail of an upper portion of the device of this invention.

In use and operation (depicted in FIGS. 1, 5, 8, 9, 11 and 12), the driver 10 functions in the following manner when installed on a wheelchair 100. To go forward the lever 40 begins in a rearward position and the pawl 50 is as shown in FIG. 9. The occupant grips the handle 20 and applies force in a forward direction. The handle 20 thus acts as one form of a lever rotational input means. The lever 40 then begins to rotate about the spindle boss 81, along arrow A. The teeth 52 of the pawl 50 bite into the tire 130 as the pawl 50 pivots about arrow C. The action of the pawl 50 and the teeth 52 cause the lever 40, handle 20 and wheel 120 to all rotate together along arrow A. The wheel 120 rotates along arrow A causing the wheelchair 100 to move. As the occupant continues to apply force to the handle 20 the wheel 120 continues to rotate. To go in reverse the pawl is rotated along arrow C as depicted in FIG. 11 and the driver 10 is moved from a forward to a rearward position along arrow B.

During lever rotation along arrows A or B, the lever arm 40 is limited in motion by the restricting plate 85 contacting the web 49. Eventually the web 49 contacts the end 85a of the plate 85 or the occupant stops pushing or pulling the handle 20. The wheel 120 then rotates without further lever 40 motion (due to wheelchair 100 momentum) without the pawl 50 biting into the tire 130 and remains slightly out of engagement with the tire 130. Even with the pawl 50 released and the wheel 120 still rotating, the occupant can apply a rearward non-driving force to the handle 20 causing the lever 40 to return to its starting, rearward position. The occupant can then repeat the above process. With each driving rotation of the lever 40, more force is applied tangentially to the wheel 120 increasing the speed of the wheelchair 100.

If the occupant wishes to decrease the speed of the wheelchair 100, the occupant can apply a force outward along arrow F on the handle 20. This causes the lever 40 to pivot outward, perpendicular to the forward and rearward motions described above. The lever 40 can pivot outward as permitted by the beveled notches 45. This outward pivoting causes the brake pad 60 to engage the rim 140 of the wheel 120. Friction between the brake pad 60 and the rim 140 causes the wheel 120 to slow down which causes the wheelchair 100 to slow down.

To back up the wheelchair, the pawl 50 assumes the FIG. 11 position by moving the handle 55 counter-clockwise. This causes the teeth bias to grab in the opposite direction and permits reverse drive rotation.

The handle 20 is rotatable along arrow "L" and arrow "E". The handle 20 can be locked into position in the desired location or allowed to rotate freely during driver 10 use.

Figure 12:
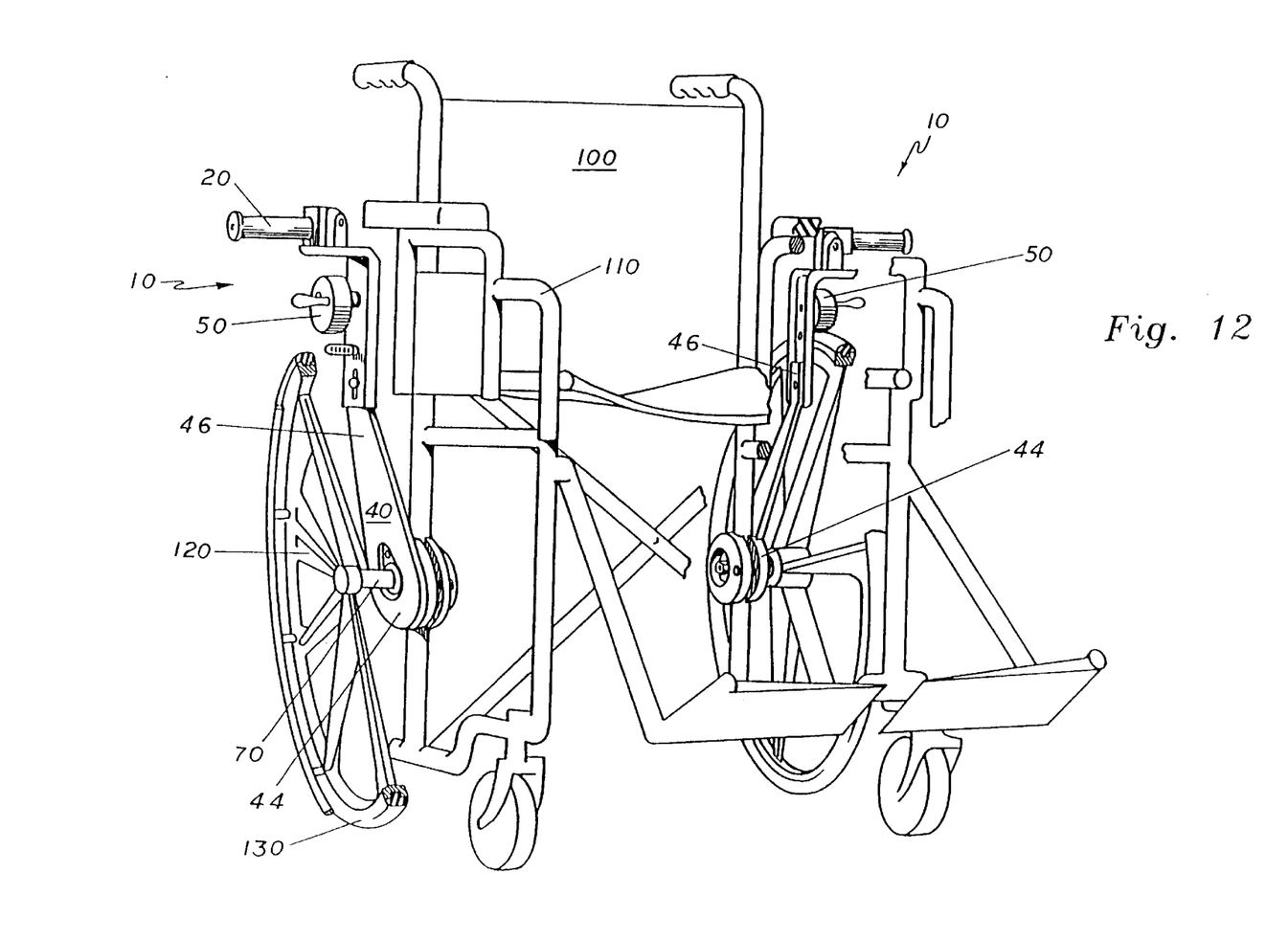
FIG. 12 is a perspective view of the apparatus mounted around both wheels of a wheelchair.

For efficient movement of the wheelchair 100 it should be equipped with a driver 10 on each side of the wheelchair 100 as in FIG. 12 so each large wheel 120 is being driven. This configuration prevents the wheelchair 100 from turning due to unequally applied forces. Furthermore, this configuration allows tight rotation of the wheelchair 100 when one driver 10 is braked or reversed and the other driver 10 on the opposite side is in a forward mode.

With reference now to FIGS. 13 through 28, details of an alternative embodiment 210 of the wheelchair driver 10 is shown and described. In essence, the wheelchair driver 210 includes a handle 220 supported upon a pawl support 230 which is attached to an upper end 242 of a lever 240. The lever 240 includes a collar 246 opposite the upper end 242 which pivots upon a lever support assembly 260. A pawl 250 is pivotably supported within the pawl support 230 in a manner which allows the pawl 250 to interact with the tire 130 of the wheel 120 (FIG. 12) of the wheelchair frame 110. The lever support assembly 260 includes an inner half 262 and an outer half 264 connected together and surrounding the frame 110 (FIG. 12). A boss plate 280 is attached to the outer half 264 of the lever support assembly 260. The boss plate 280 includes a cylindrical race 284. The cylindrical race 284 supports a bearing 248 within the collar 246 of the lever 240, allowing the lever 240 to pivot about the cylindrical race 284 of the boss plate 280.

Figures 13, 14, 15:
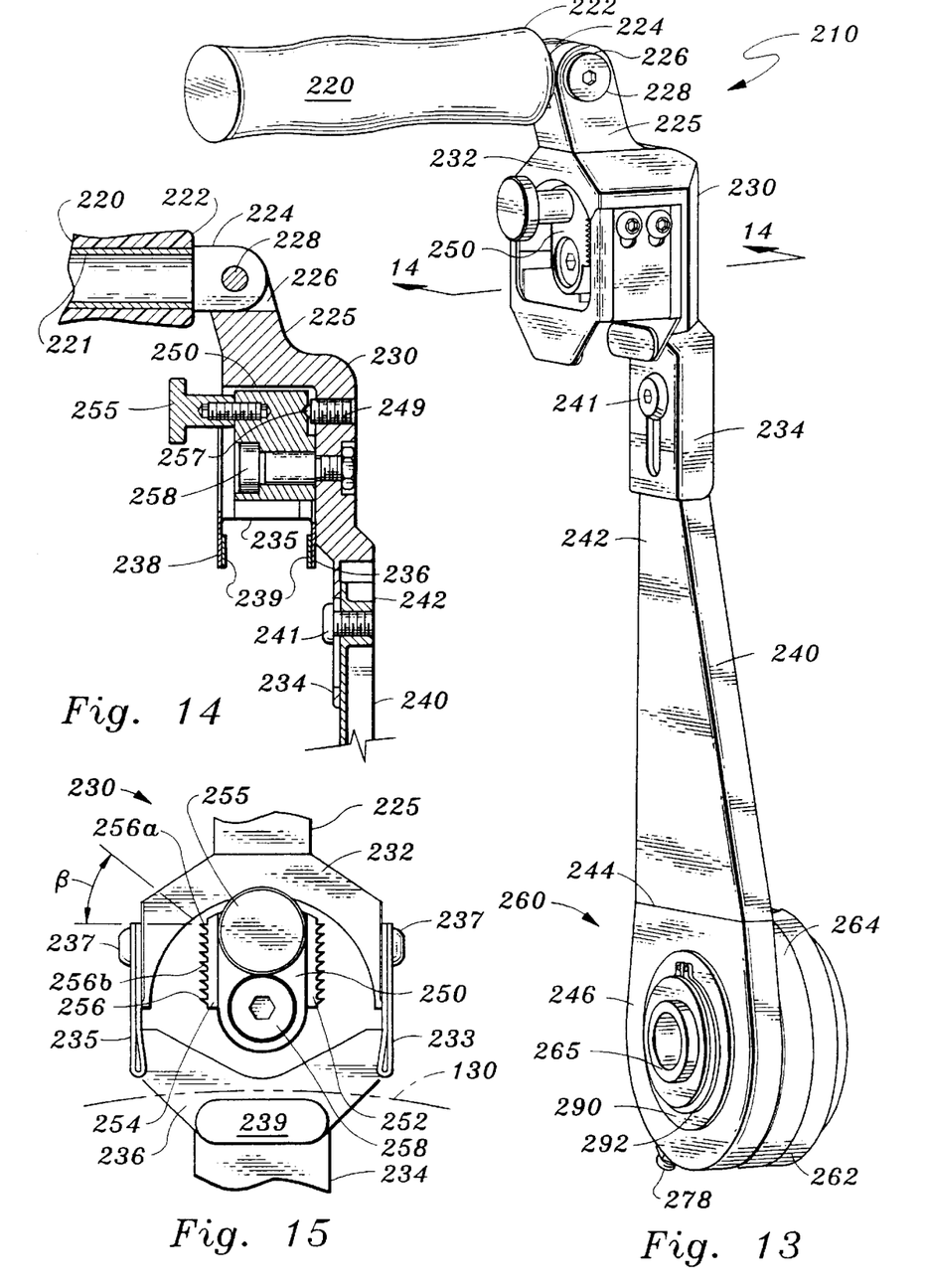
FIG. 13 is a perspective view of an alternative embodiment of the wheelchair driver of this invention.
FIG. 14 is a sectional view of a portion of that which is shown in FIG. 13 taken along lines 14—14 of FIG. 13.
FIG. 15 is a side view of a portion of that which is shown in FIG. 13 with the outline of a tire superimposed thereon.
Figure 16:
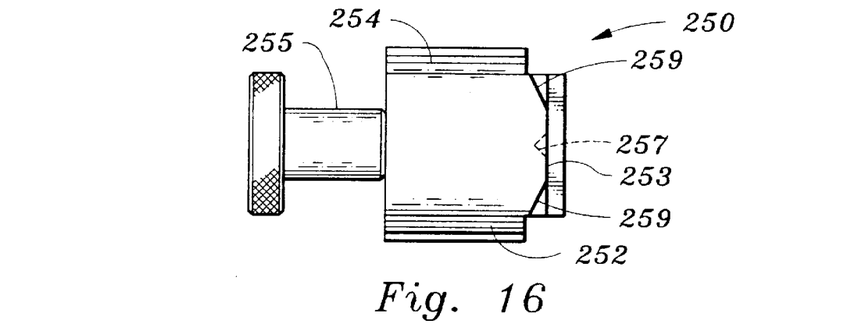
FIG. 16 is a top view of a pawl of this invention.
Figure 18:
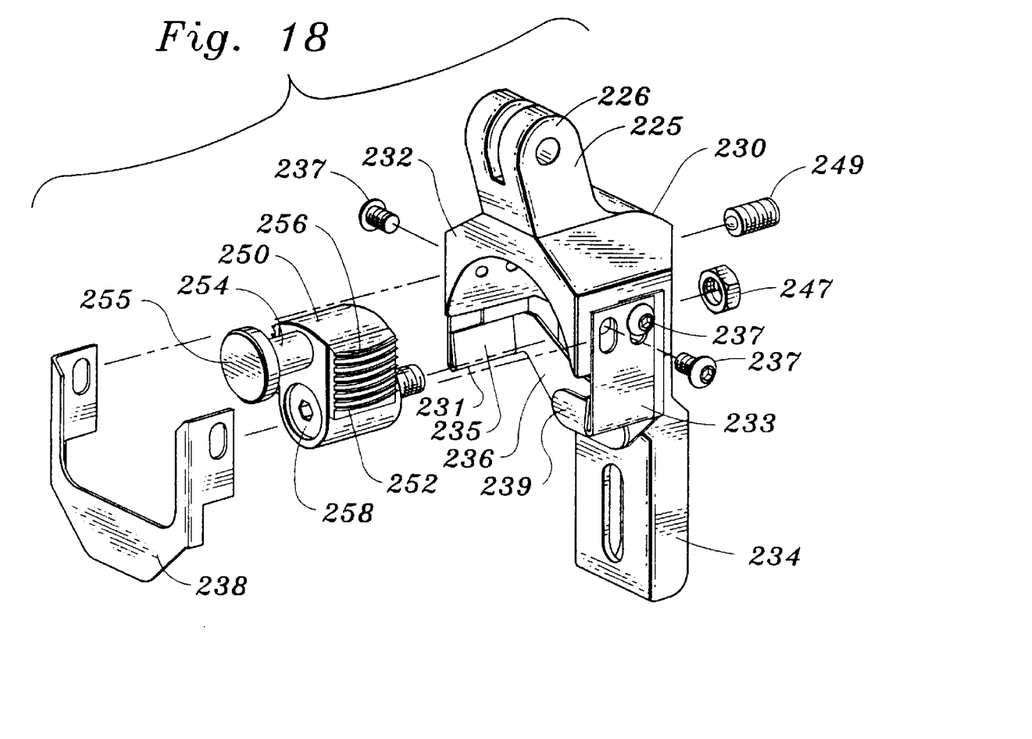
FIG. 18 is an exploded parts view of a portion of that which is shown in FIG. 13.

More specifically, and with reference to FIGS. 13, 14 and 18, details of the handle 220 are shown. The handle 220 is preferably a somewhat cylindrical construct with a length similar to a width of a hand of a user. The handle 220 preferably includes a surface which is formed from a material which readily sticks to the hand of a user. The surface is supported upon a rigid tubular cylindrical handle core 221. An attached end 222 of the handle 220 includes a tab 224 extending therefrom. A riser 225 is supported upon a top surface of the pawl support 230. The riser 225 includes two knuckles 226 extending upwardly from the riser 225. The knuckles 226 are spaced apart by a distance similar to a thickness of the tab 224. Holes are located through the knuckles 226 and through the tab 224 which are capable of axial alignment. A pivot pin 228 passes through the holes within the knuckles 226 and the tab 224 to pivotably attach the handle 220 to the riser 225 and hence to the pawl support 230.

The handle 220 can be oriented either in a horizontal position, as shown in FIG. 13, or can be pivoted upward about the pivot pin 226 into a vertical orientation, or some orientation in between. Thus, the handle 220 can be adjusted to adjust to the particular needs of the user.

The pawl support 230, shown in FIGS. 13 through 15 and 18 through 20, includes a fender 232 supported above a mounting bracket 234. The fender 232 approximates a crescent shape with a concave surface facing downward and extends away from the mounting bracket 234 into a position which overlies the tire 130. The mounting bracket 234 is oriented inboard of the tire 130 and associated wheel 120 (FIG. 12) and is adjustably attachable to the upper end 242 of the lever 240. An adjustment bolt 241 adjustably attaches the mounting bracket 234 of the pawl support 230 to the lever 240.

An inside brake support 236 is oriented below the fender 232 and adjacent the mounting bracket 234 on a side of the mounting bracket 234 closest to the wheel 120 (FIG. 12). The inside brake support 236 is attached to the fender 232 through bolts 237, one bolt 237 at each forward and rearward end of the fender 232. An outside brake support 238 is bolted to the fender 232 through bolts 237 in a manner similar to the inside brake support 236. The outside brake support 238 is oriented to reside on a side of the wheel 120 (FIG. 12) opposite the inside brake support 236. The two brake supports 236, 238 are spaced apart by a distance similar to a width of the pawl 250 and a width of the wheel 120.

Each brake support 236, 238 extends downward to a location adjacent the rim 140 (FIG. 1) of the wheel 120. Pads 239 are oriented upon the brake supports 236, 238 at locations adjacent the rim 140 of the wheel 120. In this position, the pads 239 can be caused to impact the rim 140, to perform braking or steering functions whenever the lever 240 is pivoted slightly toward the wheel 120 or away from the wheel 120. Preferably, the lever 240 includes a cylindrical bearing 248 within the collar 246 which has an inner diameter sized to pivot upon the lever support assembly 260. The bearing 248 is tolerenced to allow pivoting of the lever 240 in a manner which facilitates activation of the pads 239 against the rim 140 of the wheel 120 when braking or steering is desired by the user.

A forward brake mount 233 is interposed between the inside brake mount 236 and the outside brake mount 238 on a forward leading edge of the pawl support 230. The forward brake mount 233 extends down from the fender 232 and is attached thereto by the bolts 237 which simultaneously support the brake supports 236, 238. A rearward brake mount 235 is interposed between the brake supports 236, 238 on a rearward most side of the pawl support 230 in a manner similar to that of the forward brake mount 233. The forward brake mount 233 and rearward brake mount 235 include a brake 231 at a bottom most edge thereof. This brake 231 is oriented slightly above the tire 130 of the wheel 120 in normal wheelchair driver 210 operation. However, when an auxiliary brake is desired, and properly activated as will be discussed below, the brakes 231 are translated downward into contact with the tire 130, causing wheel 120 rotational speed to be reduced.

Referring now to FIGS. 13 through 20, details of the pawl 250 are shown. The pawl 250 is preferably a unitary mass having a forward face 252 with teeth 256 thereon and rearward face 254 with teeth 256 thereon. A lower end of the pawl 250, as oriented in FIG. 15, has a pivot bolt 258 passing therethrough which is attached to the pawl support 230 with a nut 247. The pawl 250 is thus pivotably attached to the pawl support 230. A knob 255 is securely attached to an upper portion of the pawl 250 through which a user may cause the pawl 250 to be pivoted about the pivot bolt 258.

An inside surface 253 of the pawl 250 is located adjacent the mounting bracket 234 of the pawl support 230. The inside surface 253 includes bevels 259 between the inside surface 253 and the forward face 252 and between the inside surface 253 and the rearward face 254. The bevel 259 is preferably angled at approximately 30° with respect to a plane of the inside surface 253. The inside surface 253 includes a detent 257 at a central upper portion of the inside surface 253. The detent 257 is essentially a conical pit within the inside surface 253 which extends slightly into the pawl 250.

A spring retainer 249 is formed within the pawl support 230 at a location directly adjacent the detent 257 of the pawl 250 when the pawl 250 is oriented vertically above the pivot bolt 258. The spring retainer 249 is configured to extend into the detent 257 but can translate inward away from the pawl 250 when a sufficient force is applied. Thus, when the pawl 250 is oriented vertically above the pivot bolt 258, the spring retainer 249 rests within the detent 257 and holds the pawl 250 vertically above the pivot bolt 258. When a sufficient lateral force is applied to the pawl 250, the spring retainer 248 is translated out of the detent 257. The pawl 250 is then allowed to rotate freely about the pivot bolt 258.

When the pawl 250 is oriented vertically above the pivot bolt 258, the pawl 250 is prevented from contacting the tire 130, and is thus in a neutral position. The detent 257 and spring retainer 249 assist in maintaining the pawl 250 within this neutral position until a user desires to pivot the pawl 250 out of this neutral position. The fender 232 of the pawl support 230 is configured to allow the pawl 250 to rotate about the pivot bolt 258 without impacting the fender 232.

Figure 19:
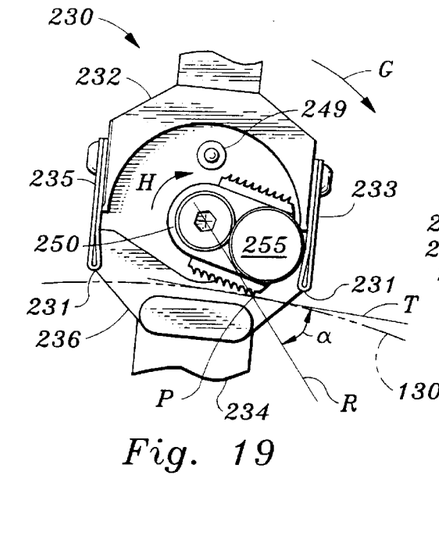
FIG. 19 is a side view of a portion of the wheelchair driver of this invention in operation against a tire of a wheelchair.
Figure 20:
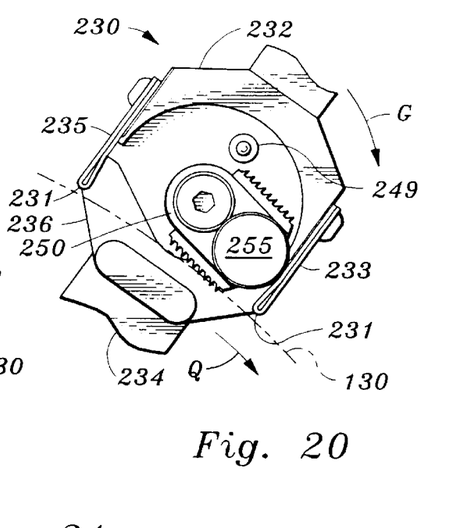
FIG. 20 is a side view of a portion of the wheelchair driver of this invention during rotating of a wheel of the wheelchair.
Figure 21:
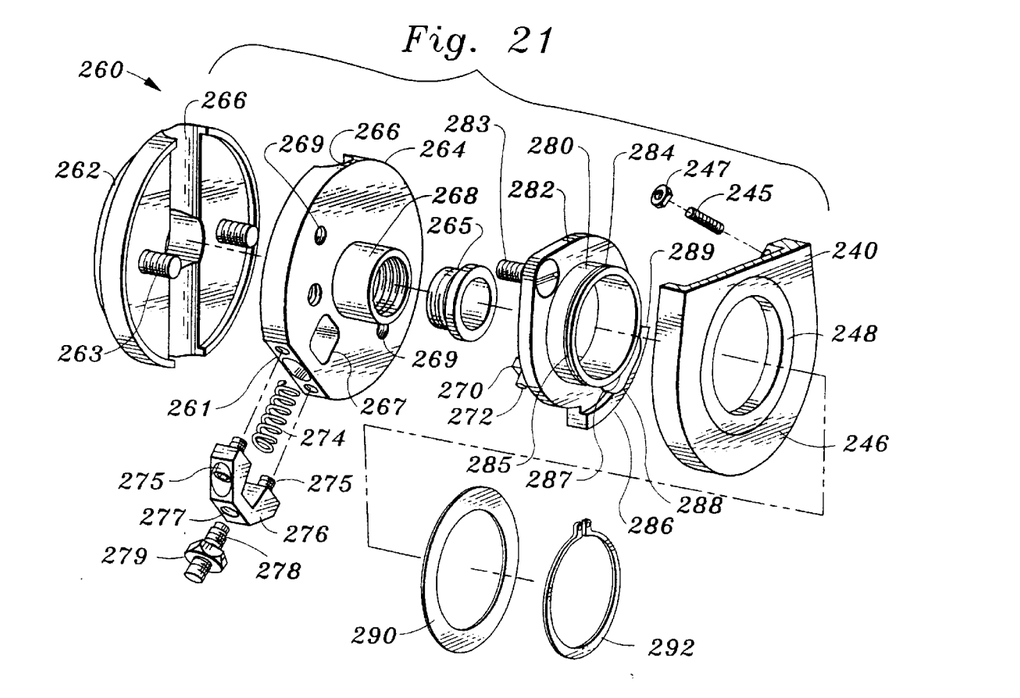
FIG. 21 is an exploded parts view of a lever support assembly which rotatably supports a lever of the wheelchair driver of this invention.

Referring now to FIGS. 19 and 20, details are shown of pawl 250 operation to drive the tire 130 of the wheelchair 100 (FIG. 12). For forward operation, the pawl 250 is initially taken out of the neutral position with the spring retainer 249 resting within the detent 257 and rotated forward along arrow H (FIG. 19) until the forward face 252 of the pawl 250 rests against the tire 130. The handle 220 (FIG. 13) is then activated by a hand of the user, causing the pawl support 230 and attached lever 240 to rotate about arrow G (FIG. 20). Lever 240 rotation causes the teeth 256 to dig into the tire 130 and causes the tire 230 to rotate along arrow Q. When the lever 240 is stopped from rotating along arrow G, momentum of the wheel 120 and attached chair 100 (FIG. 12) causes the tire 130 to continue rotating about arrow Q thus causing the teeth 256 to release the tire 130.

The teeth 236 are biased to assist in gripping and releasing the tire 130 as desired. With reference to FIG. 15, the teeth 256 include a forward surface 256a which is substantially horizontal when the pawl 250 is in its neutral position and a rearward surface 256b which is angled at an angle β with respect to the forward surface 256a. Preferably, the angle β is approximately 30°. The teeth 256 thus have an appearance from the side which causes them to appear swept forward and to grip the tire 130 more securely when translated along a surface of the tire 130 in a forward direction then in a reverse direction. This biasing of the teeth 256 assists in release of the tire 130 by the pawl 250 when the lever 240 is stopped from rotating along arrow G (FIG. 20) but momentum of the chair keeps the tire 130 rotating along arrow Q.

Figure 17:
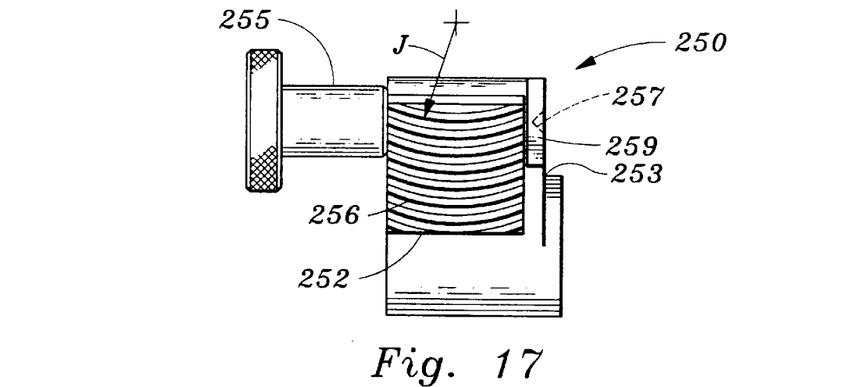
FIG. 17 is a front view of that which is shown in FIG. 16.

The teeth 256 are preferably curved when viewed from the front or from the rear with a radius of curvature J (FIG. 17). This slight radius of curvature J of the teeth 256 assists in preventing the tire 130 from being encouraged to pivot inward or outward when impacted by the pawl 250. Hence, the teeth 256 are kept precisely aligned within the pawl support 230 and the pads 239 of the pawl support 230 are kept away from the rim 140 of the wheel 120 unless specifically directed against the rim 140 by a user.

The pawl 250 is preferably configured to have a height and a pivoting location within the pawl support 230 that orients a contact point P between the teeth 256 of the pawl 250 and the tire 130 significantly forward from the pivoting bolt 258 of the pawl 250 when the pawl 250 is in forward operation (FIG. 19). Specifically, a tangent line T, oriented tangent to the tire 130 at the contact point P, diverges at an angle α from a line passing from a center of the pivot bolt 259 and through the contact point P. This angle α is preferably less than 45°. Thus, the teeth 256 are driven into the tire 130 but are prevented from depressing the tire 130 sufficiently to cause the pawl 250 to rotate under the pivot bolt 258.

For operation in reverse, the pawl 250 is rotated in a direction opposite of that represented by arrow H, through a vertical position above the pivot bolt 258, and downward until the rearward face 254 of the pawl 250 impacts the tire 130. The lever 240 can then be displaced in a direction opposite of that represented by arrow G, causing the tire 130 to rotate in a direction opposite of that represented by arrow Q and hence causing the chair to move in reverse.

Referring now to FIG. 13, details of the lever 240 are shown. The lever 240 includes the upper end 242 which attaches to the pawl support 230 and handle 220 and the collar 246 which supports a bearing 248 which slides upon the lever support assembly 260. A bend 244 is formed in the lever 240 between the collar 246 and the upper end 242 which locates the upper end 242 closer to the wheel 120 (FIG. 12) than the collar 246. The bend is preferably approximately 7°. The lever 240 is preferably cast from aluminum. However, any material can be used which can support the necessary loads.

With reference to FIGS. 21 through 28, details of the lever support assembly 260 and the lever 240 attachment thereto are shown and described. The lever support assembly 260 includes an inner half 262 and an outer half 264. Each of the halves 262, 264 is a rigid substantially disc shaped construct with a semi-cylindrical frame channel 266 passing vertically through each half 262, 264. Bolts 263 extend through the halves 262, 264, tightening the two halves 262, 264 together in a location surrounding the frame 110 (FIG. 12) of the wheel chair 100. The outer half 264 includes a sleeve 268 extending away from the inner half 262 a short distance at a geometric center of the outer half 264. The sleeve 268 is a hollow cylindrical construct which has an inner diameter greater than an outer diameter of a horizontal frame extension 70 of the frame 110 of the wheelchair 100 (FIG. 12).

An insert 265 is threadably received within the sleeve 268. The insert 268 has an inner diameter similar to an outer diameter of the horizontal frame extension 70. When a horizontal frame extension size is different for different models of wheelchairs 100, an appropriate insert 265 is selected so that the insert 265, when threaded into the sleeve 268 of the outer half 264, tightly aligns the lever support assembly 260 to the frame 110 at a position substantially concentric with a rotational axis of the wheel 120.

A boss plate 280 is attached through bolts 283 (FIG. 22) to the outer half 264 of the lever support assembly 260. One pivot bolt 283 passes through a threaded hole 269 in the outer half 264 which is located in an upper rearward quarter of the outer half 264. A second threaded hole 269 is located in a forward lower quarter of the outer half 264 directly opposite the other threaded hole 269. The lower forward slide bolt 281 passes through a slot 288 in the boss plate 280. The slot 288 has a width similar to a width of the slide bolt 281 but has a length greater than a width of the slide bolt 281 and which is slightly arcuate with a radius of curvature similar to a distance between the two bolts 281, 283. Thus, the boss plate 280 can pivot about the pivot bolt 283 slightly with the slide bolt 281 remaining stationary but allowing the slot 288 and associated boss plate 280 to pass thereunder in a downward and rearward direction.

The boss plate 280 is a rigid ring-like structure including an annulus 282 with an irregular periphery supporting the bolts 281, 283 and a cylindrical race 284 extending from an axial center of the annulus 282 and away from the halves 262, 264 toward the wheel 120. The boss plate 280 is hollow within the interior of the cylindrical race 284. Thus, the sleeve 268 is allowed to reside within the cylindrical race 284. The cylindrical race 284 supports the collar 246 of the lever 240 through the bearing 248. The cylindrical race 284 includes a groove 285 near an edge thereof distant from the annulus 282. The groove 285 is sized to receive a lock ring 292 which can support a washer 290 over the cylindrical race 284, which in turn can support the collar 246 of the lever 240 upon the cylindrical race 284. The bearing 248 provides a low friction surface directly adjacent the cylindrical race 284 allowing the collar 246 of the lever 240 to easily rotate about the cylindrical race 284 as the lever 240 is rotated about arrow G (FIGS. 19 and 20).

The boss plate 280 is prevented from undesired pivoting about the pivot bolt 283 through force applied by a spring 274 within the outer half 264 of the lever support assembly 260. The outer half 264 includes a flat edge 261 which has an arch 276 mounted thereupon. The outer half 264 also includes a clearance passage 267 which is substantially rectangular and passes entirely through the outer half 264 at a lower rearward quarter thereof adjacent the flat edge 261. This clearance passage 267 not only passes through the outer half 264 but also passes through the flat edge 261 of the outer half 264. The arch 276 includes a threaded hole 277 which receives an alignment pin 278 therethrough which can be threaded into a variety of different positions with a nut 279. The alignment pin 278 supports one end of the spring 274 as it extends through into the clearance passage 267 within the outer half 264.

The boss plate 280 includes a tab 270 extending perpendicularly from a side of the annulus 282 opposite the cylindrical race 284 and in a lower rearward position on the boss plate 280. The tab 270 has a width less than a width of the clearance passage 267 and resides within the clearance passage 267 when the boss plate 280 is attached to the outer half 264. A pin 272 is attached to the tab 270 and extends toward the hole 277 of the arch 276. The pin 272 supports an end of the spring 274 opposite the alignment pin 278. Thus, the spring 274 forces the boss plate 280, through the tab 270, into an upward position when no force is applied against the spring 274.

Figure 22:
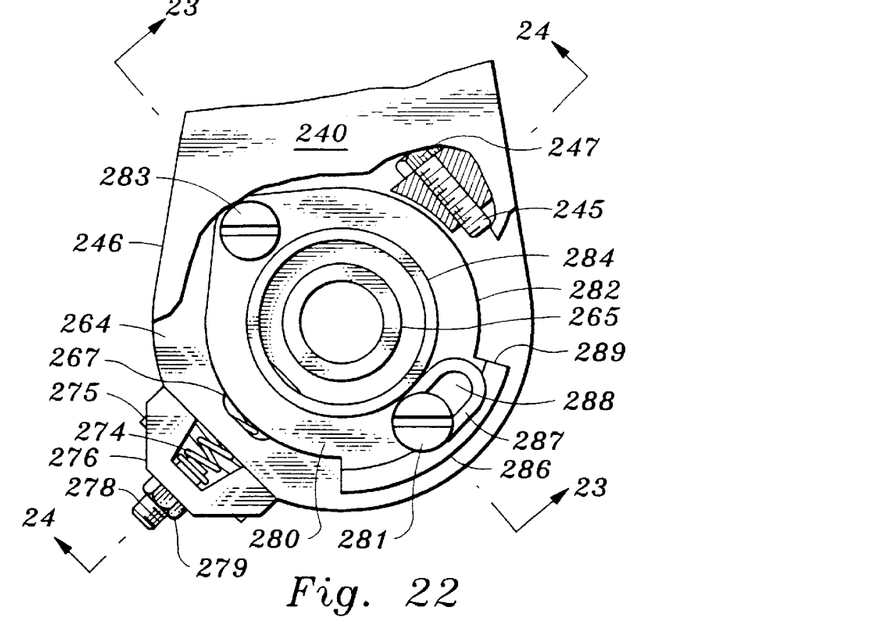
FIG. 22 is a side view of the lever support assembly with portions cut away to reveal interior details.
Figure 23:
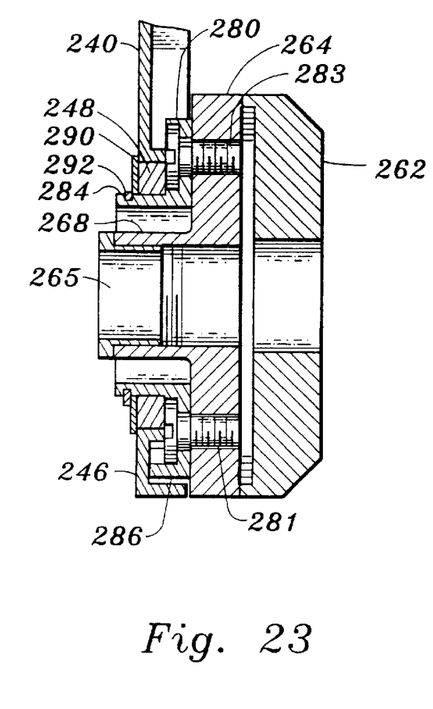
FIG. 23 is a sectional view taken along lines 23—23 of FIG. 22.
Figure 24:
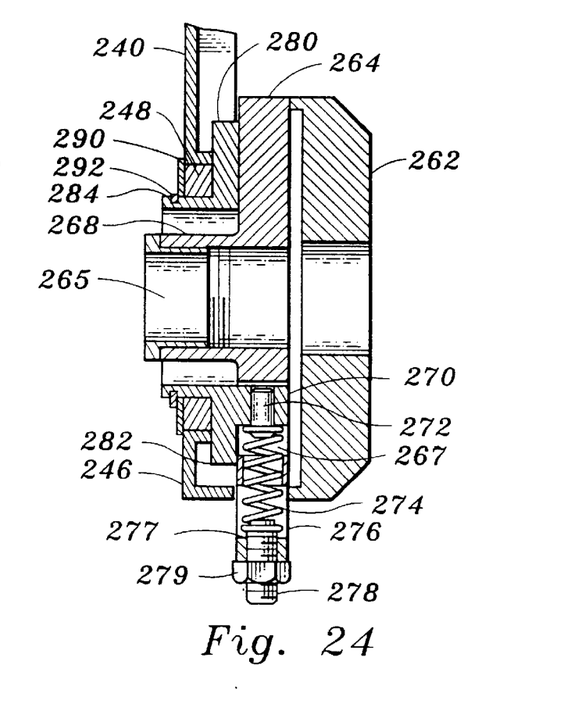
FIG. 24 is a sectional view taken along lines 24—24 of FIG. 22.
Figures 25, 26, 27, 28:
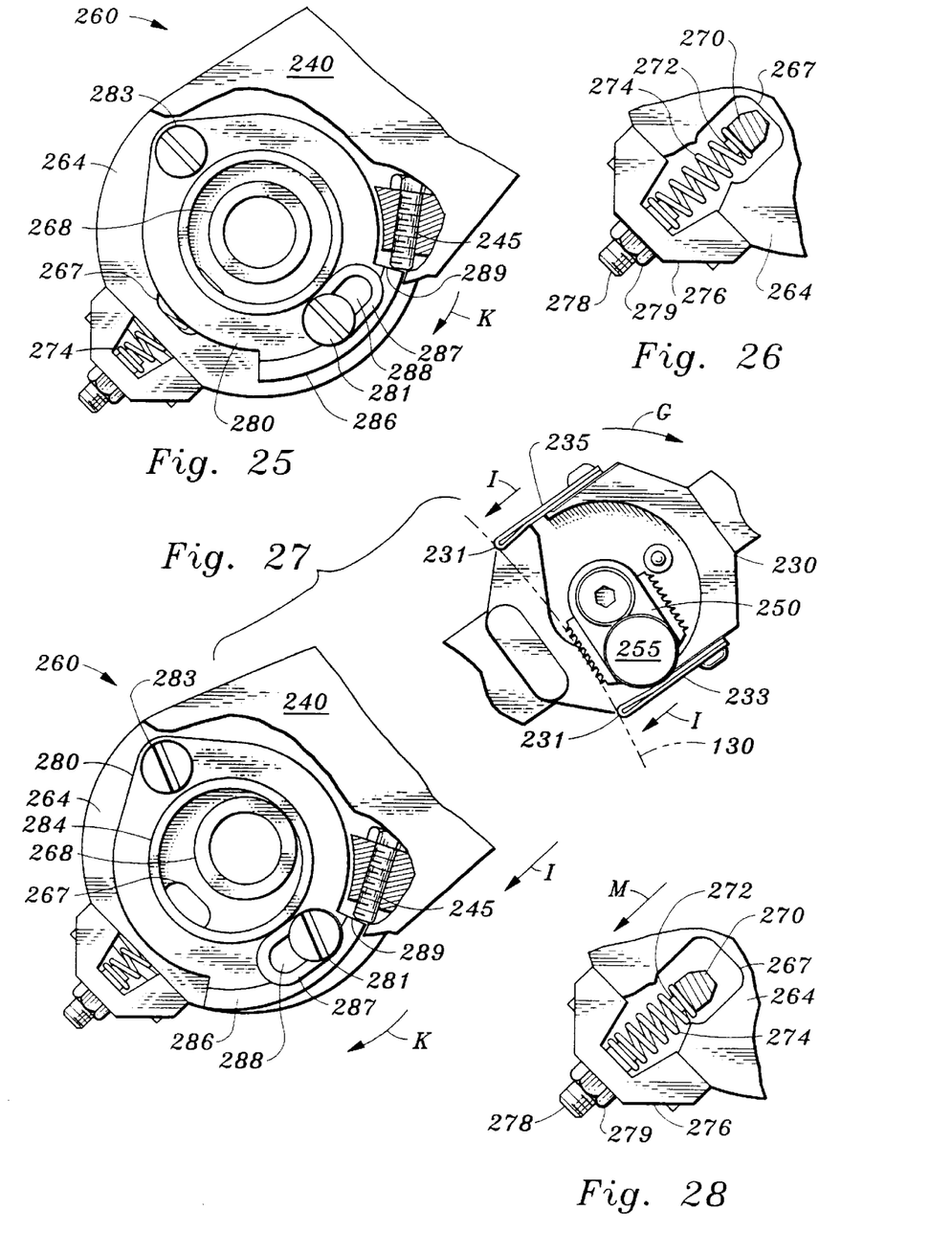
FIG. 25 is a side view of the lever support assembly of this invention with portions cut away to reveal interior details.
FIG. 26 is a side view of a portion of that which is shown in FIG. 25 with portions of the lever support assembly cut away to reveal interior details.
FIG. 27 is a side view of the wheelchair driver of this invention in a position exhibiting an auxiliary brake feature of the alternative embodiment of this invention.
FIG. 28 is a side view of a portion of that which is shown in FIG. 27 with portions of the lever support assembly removed to reveal interior details.

The collar 246 of the lever 240 includes an actuating pin 245 attached thereto through a nut 247 (FIGS. 22, 25 and 27). The actuating pin 245 is oriented a distance radially away from an axle supporting the wheel 120 slightly greater than a periphery of the annulus 282 of the boss plate 280. The annulus 282 supports a fin 286 which extends outwardly from the cylindrical race 284 in a lower forward region thereof near the slot 288. The fin 286 includes an edge 289 thereon which is oriented substantially horizontal on a forward side of the boss plate 280. The edge 289 and the fin 286 both extend outward from an axial center of the wheel 280 a distance similar to a distance of the actuating pin 245. Thus, when the lever 240 is rotated forward a sufficient distance, the actuating pin 245 is caused to impact the edge 289 of the fin 286.

This contact of the actuating pin 245 against the edge 289 of the fin 286, if accompanied with sufficient force, causes the boss plate 280 to rotate about the pivot bolt 283 along arrow K (FIG. 25). The slide bolt 281 simultaneously slides within the slot 288. Preferably, the slot 288 has a low friction upper surface 287 which facilitates sliding of the slide bolt 281 within the slot 288. This force applied by actuating pin 245 is opposed by the spring 274. However, when sufficient force is applied, the spring 274 is compressed along the boss plate 280, rotating along arrow K until the cylindrical race 284 abuts against the sleeve 268. This rotation of the boss plate 280 in turn causes the lever 240 to be lowered toward the sleeve 268 along arrow I and toward an axial center of the wheel 120 (FIG. 12). This action of the lever 240 toward the sleeve 268 causes the brakes 231 of the pawl support 230 to impact the tire 130, causing the auxiliary brake to be activated. Spring compression, along arrow M of FIG. 28, is maintained until the lever 240 is rotated in a direction opposite of that of arrow G (FIG. 27). This allows the boss plate 280 to rotate in a direction opposite that of arrow K, causing the brakes 231 to travel in a direction opposite that of arrow I and release the tire 130.

Thus, when a user desires additional braking force, the lever 240 is rotated forward until the actuating pin 245 abuts against the edge 289 of the fin 286. Further rotation of the lever 240 forward, along arrow G, causes the spring 274 to be compressed and the boss plate 280 to rotate along arrow K with the entire lever 240 translating along arrow I. This causes the brake 231 to impact the tire 130. When a user wishes to release the brakes 231, the lever 240 is rotated in a direction opposite that of arrow G, allowing the brakes 231 to be released from the tire 130 by force of the spring 274 pushing the boss plate 280 back into position.

While the spring 274 and associated assembly are preferably located in a lower rearward quarter of the outer half 264, the spring 274 can be located in a forward lower quarter of the outer half 264 such that the auxiliary brake 231 is activated by pulling back strongly on the lever 240 instead of requiring pushing the lever 240 forward. This arrangement can be obtained by merely swapping the entire wheelchair driver 210 on the right hand side with the wheelchair driver on the left hand side.

The user can select a spring 274 having a desired force constant which prevents unwanted brake 231 activation but allows ready brake 231 action when desired. Also, the activating pin 245 can be adjusted, through nut 247, to adjust a timing of when the brake 231 is activated. Finally, the alignment pin 278 can be adjusted, through the nut 279, to program the spring 274 with a desired amount of precompression, thereby fine tuning brake 231 performance.

Moreover, having thus described the invention, it should be apparent that numerous structural modifications and adaptations may be resorted to without departing from the scope and fair meaning of the instant invention as set forth hereinabove and as described hereinbelow by the claims.

INDUSTRIAL APPLICABILITY

The industrial applicability of this invention shall be demonstrated through discussion of the following objects of the invention.

It is a primary object of the present invention to provide a device which allows a wheelchair user to move the wheelchair without assistance and without requiring the coordination necessary to continually grip and release a moving part of the wheelchair. Through use of the present invention, a user need only rock a handle of each driver along a short arcuate path.

Another object of the present invention is to provide a device as characterized above which is easy to install on a standard wheelchair. This feature presents the invention in a form which allows it to be connected to a user's previously existing wheelchair.

Another further object of the present invention is to provide a wheelchair motion device which is low in friction allowing the wheelchair to roll easily and efficiently. A user can thus use the wheelchair for longer times and greater distances before growing weary.

Another further object of the present invention is to provide a wheelchair motion device which requires little force for effective movement, benefiting a user of limited physical ability.

Another further object of the present invention is to provide a wheelchair motion device which is safe to operate and keeps the user's hands well away from any dangerous mechanical parts, by keeping the user's hands stationary on the handles at all times.

Another further object of the present invention is to provide a wheelchair motion device which is durable, and requires little maintenance.

Another further object of the present invention is to provide a wheelchair motion device which is constructed of materials and is of a design lending itself to easy mass manufacturing techniques.

Another further object of the present invention is to provide a wheelchair motion device of simple construction, providing for easy repairs and modifications thereof.

Another further object of the present invention is to provide a wheelchair motion device which is adjustable for modification to conform to a user's personal preferences.

Another further object of the present invention is to provide a wheelchair motion device which is simple in operation allowing a user to easily learn how to utilize it in both a forward and rearward direction.

Viewed from a first vantage point, it is an object of the present invention to provide a device for manually imparting motion to a wheelchair comprised of a lever pivotally attached to a spindle sleeve fixedly attached to a horizontal frame portion of the wheelchair concentric with a wheel's axle between the frame and said wheel of the wheelchair, a wheel-gripping means attached to said lever, and a lever rotational input means attached to said lever, whereby said lever may be rotated about said sleeve when force is applied to said lever rotational input means causing said wheel-gripping means to grip a tire on the wheel resulting in rotation of the wheel of the wheelchair.

Viewed from a second vantage point, it is an object of the present invention to provide a wheelchair having an easily operable manual translation system comprised of a chair mounted on axles having two large primary wheels, and a plurality of wheelchair drivers mounted upon a horizontal portion of the wheelchair's frame between said chair and said wheels which surrounds and supports said axles, each of said drivers having a lever having an axial end rotatably attached to a spindle sleeve fixedly attached around said horizontal portion of the wheelchair's frame, a handle on an orbiting end of said lever said orbiting end remote from said axial end, and a pawl rotatably extending from said lever over a tire of said wheel at a distance from said spindle sleeve equal to the distance from said spindle sleeve to said tire; whereby a user sitting in said wheelchair can move said wheelchair by pushing on said handles of said drivers causing said pawls to engage said tires of said wheels of said wheelchair.

Viewed from a third vantage point, it is an object of the present invention to provide a A kit for adding a means of manually driving to a wheelchair comprised of a plurality of spindle sleeves mountable to a horizontal axle receiving portion of the wheelchair between wheels and a frame of the wheelchair, a plurality of levers, each having axial ends and orbital ends, said axial ends each having a lever collar carried on said spindle sleeves and extending upward to said orbiting end located between the wheels and the frame of the wheelchair, a plurality of handles attached to said orbiting end of said levers designed to be oriented in a variety of different configurations for ease of engaging by a user, and a plurality of pawls rotatably attached to said levers near said orbiting ends in an orientation allowing said pawls to grip tires mounted on the wheels; whereby a user may engage said handles and cause said levers to rotate about the axles of the wheelchair on said spindle sleeves causing said pawls to grip the tires causing the wheels to rotate and causing the wheelchair to translate linearly along a surface.

Viewed from a fourth vantage point, it is an object of the present invention to provide wheelchair having an easily operable manual translation system comprised of a chair having a frame supporting an axle means and having two large primary wheels supported on said axle means, and a plurality of wheelchair drivers mounted upon a horizontal portion of said wheelchair frame between said chair and said wheels which surrounds and supports said axle means, each of said drivers having a lever having an axial end with a collar therein defining a hole passing through the axial end, said collar oriented with said horizontal portion of the wheelchair's frame passing therethrough, and a wheel-gripping means attached to each said lever whereby said levers can be rotated about said horizontal portion of the wheelchair's frame and impart motion to each said wheel through said wheel-gripping means without physical contact with said axle means.

We claim:

1. A wheelchair including means for manually imparting motion to said wheelchair comprising, in combination:
    a lever pivotally attached to a spindle sleeve concentric with a wheel's axle between a frame and a wheel of the wheelchair,
    a wheel-gripping means attached to said lever, and
    a plurality of braking means operatively coupled to said lever,
    wherein an auxiliary braking means is provided, said auxiliary braking means including a plurality of brakes connected to said lever and extending over a tire on said wheel, and means to translate said lever radially toward said wheel's axle a distance sufficient to cause said brakes to impact said tire.

2. A wheelchair comprising, in combination:
- a lever pivotally attached to a spindle sleeve concentric with a wheel's axle between a frame and a wheel of said wheelchair,
- a wheel-gripping means attached to said lever, and
- a plurality of braking means operatively coupled to said lever,
- wherein said wheelchair has a lever rotation restricting means coupled to said lever, whereby rotation of said lever is restricted to a finite arc,
- wherein said lever rotation restricting means is an arcuate restricting web on an axle end of said lever and a restricting plate attached to said spindle sleeve and residing adjacent said restricting web;
- whereby rotation of said lever around said spindle sleeve is restricted to an arc of finite width defined by clearance between said restricting web and said plate.

3. A wheelchair comprising, in combination:
- a lever pivotally attached to a spindle sleeve concentric with a wheel's axle between a frame and a wheel of said wheelchair,
- a wheel-gripping means attached to said lever, and
- a plurality of braking means operatively coupled to said lever,
- wherein said wheel-gripping means is a pivoting pawl having means to reversibly set teeth oriented to bite into a tire located on said wheel when said lever is rotated in one direction and shaped to pivot, releasing said tire, when rotated in reverse;
- whereby when a user rotates said lever in said one direction, said pawl engages said tire of said wheel causing said wheel to rotate and whereby when a user rotates said lever in an opposite direction, said pawl releases said tire allowing said wheelchair to continue under momentum until said lever is again rotated in said one direction.

4. The wheelchair of claim 3 wherein said pawl is shaped to securely grip the tire without slippage when said lever is engaged in said one direction and to easily release from the tire when said lever is rotated in said opposite direction.

5. A wheelchair comprising, in combination:
- a lever pivotally attached to a spindle sleeve concentric with a wheel's axle between a frame and a wheel of said wheelchair,
- a wheel-gripping means attached to said lever, and
- a plurality of braking means operatively coupled to said lever,
- wherein said plurality of braking means includes a first wheelchair braking means operatively coupled to said lever, whereby said wheelchair provides a user with a means to stop said wheelchair when said lever is pushed in a direction perpendicular to said pivotal attachment direction,
- wherein said plurality of braking means includes a second braking means operatively coupled to said lever near an orbiting end and means to translate said lever radially toward said wheel's axle a distance sufficient to cause said said second braking means to impact a tire located on said wheel,
- whereby the user can stop the wheelchair by pushing said lever toward said wheel.

6. A wheelchair having an easily operable manual translation system comprising, in combination:
- a chair mounted on an axle having two large primary wheels,
- a plurality of wheelchair drivers mounted upon said axle between said chair and said wheels, each of said drivers having,
  - a lever having an axle end rotatable attached to a spindle sleeve,
  - a handle on an orbiting end of said lever, said orbiting end remote from said axle end, and
  - a pawl rotatable oriented within an arcuate trackway of said orbiting end of said lever over a tire located on said wheel,
- whereby a user sitting in said wheelchair can move said wheelchair by pushing on said handles of said drivers causing said pawls to engage said tires of said wheels of said wheelchair,
- wherein an auxiliary braking means is provided, said auxiliary braking means including a plurality of brakes connected to said lever and extending over said tire, and means to translate said lever radially toward the wheel's axle a distance sufficient to cause said brakes to impact the tire.

7. A wheelchair having an easily operable manual translation system comprising, in combination:
- a chair mounted on an axle having two large primary wheels,
- a plurality of wheelchair drivers mounted upon said axle between said chair and said wheels, each of said drivers having,
  - a lever having an axle end rotatably attached to a spindle sleeve.
  - a handle on an orbiting end of said lever said orbiting end remote from said axle end, and
  - a pawl rotatably oriented within an arcuate trackway of said orbiting end of said lever over a tire located on said wheel,
- whereby a user sitting in said wheelchair can move said wheelchair by pushing on said handles of said drivers causing said pawls to engage said tires of said wheels of said wheelchair,
- wherein said levers of said drivers have brake pads positioned adjacent to rims of said wheels and said axial ends of said levers have clearance means which allow said levers to pivot slightly in a direction perpendicular to both the forward and rearward rotation direction, allowing said brake pads to impact said rims of said wheels; whereby the user can stop the wheelchair by pushing said handles outward toward said wheels.

8. A wheelchair having means for manually driving said wheelchair comprising, in combination:
- a plurality of spindle sleeves mountable to a horizontal axle receiving portion of said wheelchair and between two wheels,
- a plurality of levers, each having axle ends and orbiting ends, said axle ends each having a lever collar carried on said spindle sleeves and extending upward to said orbiting end located between said wheels of said wheelchair,
- a plurality of handles attached to said orbiting end of said levers designed to be oriented in a variety of different configurations for ease of engaging by a user, and
- a plurality of pawls rotatably attached to said levers near said orbiting ends in an orientation allowing said pawls to grip tires mounted on said wheels;
- whereby a user may engage said handles and cause said levers to rotate about said axle of said wheelchair on said spindle sleeves causing said pawls to grip said tires causing said wheels to rotate and causing said wheelchair to translate linearly along a surface, wherein said levers have brake pads positioned adjacent to rims of the wheels and said axle ends of said levers have clearance means which allow said levers to pivot slightly in a direction perpendicular to both the forward and rearward rotation directions, allowing said brake pads to impact said wheels;

whereby the user can stop said wheelchair by pushing said handles towards said rims of said wheels.

9. A wheelchair comprising, in combination:

a plurality of spindle sleeves mountable to a horizontal axle of said wheelchair and between wheels, a plurality of levers, each having axle ends and orbiting ends, said axle ends each having a lever collar carried on said spindle sleeves and extending upward to said orbiting end located between said wheels of said wheelchair, a plurality of handles attached to said orbiting end of said levers designed to be oriented in a variety of different configurations for ease of engaging by a user, and a plurality of pawls rotatable attached to said levers near said orbiting ends in an orientation allowing said pawls to grip tires mounted on said wheels;

whereby a user may engage said handles and cause said levers to rotate about said axle of said wheelchair on said spindle sleeves causing said pawls to grip said tires causing said wheels to rotate and causing said wheelchair to translate linearly along a surface, wherein an auxiliary braking means is provided, said auxiliary braking means including a plurality of brakes connected to said lever and extending over said tire, and means to translate said lever radially toward said wheel's axle a distance sufficient to cause said brakes to impact said tire.

10. A wheelchair having a manual translation system comprising, in combination:

a chair having a frame supporting an axle means and having two large primary wheels supported on said axle means, and a plurality of wheelchair drivers mounted between said chair and said wheels which surrounds and supports said axle means, each of said drivers having,
 a lever having an axle end with a collar therein defining a hole passing through said axle end,
 a plurality of braking means operatively coupled to said lever;
a wheel-gripping means attached to each said lever:
whereby said levers can be rotated and impart motion to each said wheel through said wheel-gripping means,
wherein an auxiliary braking means is provided, said auxiliary braking means including a plurality of brakes connected to said lever and extending over said tire, and means to translate said lever radially toward said wheel's axle means a distance sufficient to cause said brakes to impact the tire.

11. A wheelchair comprising, in combination:

a lever pivotally attached to a spindle sleeve concentric with a wheel's axle between a frame and a wheel of said wheelchair, a wheel-gripping means attached to said lever, and a lever rotational input means attached to said lever;

whereby said lever may be rotated about said sleeve when force is applied to said lever rotational input means causing said wheel-gripping means to grip a tire on said wheel resulting in rotation of said wheel of said wheelchair; and wherein an auxiliary braking means is provided, said auxiliary braking means including a plurality of brakes connected to said lever and extending over the tire, and means to translate said lever radially toward said wheel's axle a distance sufficient to cause said brakes to impact said tire.

12. A wheelchair having an easily operable manual translation system comprising, in combination:

a chair mounted on axles having two large primary wheels, and a plurality of wheelchair drivers mounted upon said axles between said chair and said wheels, each of said drivers having:

a lever having an axial end rotatably attached to a spindle sleeve, a handle on an orbiting end of said lever said orbiting end remote from said axial end, and a pawl rotatably extending from said lever over a tire of said wheel at a distance from said spindle sleeve equal to the distance from said spindle sleeve to said tire;

whereby a user sitting in said wheelchair can move said wheelchair by pushing on said handles of said drivers causing said pawls to engage said tires of said wheels of said wheelchair;

wherein an auxiliary braking means is provided, said auxiliary braking means including a plurality of brakes connected to said lever and extending over said tire, and means to translate said lever radially toward the wheel's axle a distance sufficient to cause said brakes to impact the tire.

13. A wheelchair having means of manually driving said wheelchair comprising, in combination:

a plurality of spindle sleeves mountable to a horizontal axle receiving portion of said wheelchair between wheels, a plurality of levers, each having axle ends and orbiting ends, said axle ends each having a lever collar carried on said spindle sleeves and extending upward to said orbiting end located between said wheels of said wheelchair, a plurality of handles attached to said orbiting end of said levers designed to be oriented in a variety of different configurations for ease of engaging by a user, and a plurality of pawls rotatably attached to said levers near said orbiting ends in an orientation allowing said pawls to grip tires mounted on said wheels;

whereby a user may engage said handles and cause said levers to rotate about said axles of said wheelchair on said spindle sleeves causing said pawls to grip said tires causing said wheels to rotate and causing said wheelchair to translate linearly along a surface;

wherein an auxiliary braking means is provided, said auxiliary braking means including a plurality of brakes connected to said lever and extending over said tires, and means to translate said lever radially toward said wheel's axle a distance sufficient to cause said brakes to impact said tire.

14. A wheelchair having a manual translation system comprising, in combination:

a chair having a frame supporting an axle means and having two large primary wheels supported on said axle means, and a plurality of wheelchair drivers mounted between said chair and said wheels which surrounds and supports said axle means, each of said drivers having:

a lever having an axial end with a collar therein defining a hole passing through the axial end, and a wheel-gripping means attached to each said lever;

whereby said levers can be rotated and impart motion to each said wheel through said wheel-gripping means;

wherein an auxiliary braking means is provided, said auxiliary braking means including a plurality of brakes connected to said lever and extending over said tire, and means to translate said lever radially toward the wheel's axle a distance sufficient to cause said brakes to impact the tire.

15. A wheelchair including a device for manually imparting motion to said wheelchair, comprising, in combination:

a lever attached to a spindle sleeve concentric with a wheel's axle between a frame and a wheel of said wheelchair; and a wheel-gripping means attached to said lever and constrained within an arcuate channel, wherein an auxiliary braking means is provided, said auxiliary braking means including a plurality of brakes connected to said lever and extending over a tire, and means to translate said lever radially toward said wheel's axle a distance sufficient to cause said brakes to impact said tire.

* * * * *